Dec. 6, 1955  T. E. WILLIAMS  2,726,090

COLLET CHUCK OPERATING MECHANISM

Filed Jan. 26, 1953

INVENTOR.
THEODORE E. WILLIAMS
BY Lyon & Lyon
ATTORNEYS

United States Patent Office 2,726,090
Patented Dec. 6, 1955

2,726,090

COLLET CHUCK OPERATING MECHANISM

Theodore E. Williams, Culver City, Calif.

Application January 26, 1953, Serial No. 333,209

6 Claims. (Cl. 279—4)

My invention relates to collet chuck operating mechanisms, and including in the objects of my invention are:

First, to provide a collet chuck operating mechanism which is air operated and arranged to be mounted at the outboard end of a lathe headstock for operative engagement with the draw tube of a conventional collet chuck.

Second, to provide a collet chuck operating mechanism which is particularly arranged to permit opening and closing of the collet chuck while the lathe is turning.

Third, to provide a collet chuck operating mechanism which is particularly easy to install and remove.

With the above and other objects in view as may appear hereinafter, reference is directed to the drawings, in which.

Figure 1:
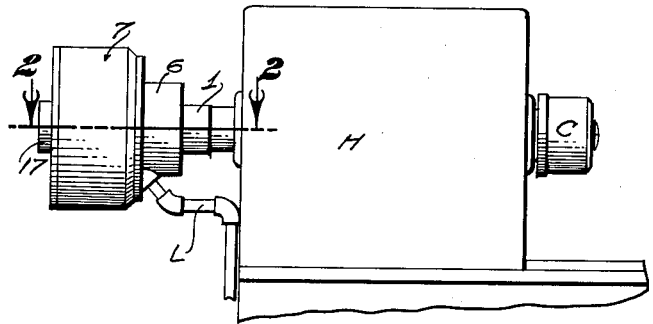
Figure 1 is a diagrammatic view of a lathe head stock and collet showing my collet chuck operating mechanism in connection therewith.

My collet chuck operating mechanism is designed to operate a standard collet chuck. Such chuck includes a collet chuck head C adapted to be mounted on the spindle protruding from the head stock H of a lathe. The conventional head stock spindle is tubular. The collet chuck is loosened or tightened by means of a draw tube D which extends through the spindle of the head stock. Normally the outboard end of the draw tube is provided with a hand wheel and sleeve which screws onto or bears against the outboard end of the head stock spindle.

My collet chuck operating mechanism is substituted for the hand wheel and the outboard end of the draw tube may be modified to cooperate with my operating mechanism.

The collet chuck operating mechanism includes a sleeve 1 which may bear against or screw onto the outboard end of the head stock spindle (not shown). The sleeve is provided with a radial pin 2 which extends into a slot 3 provided in the draw tube D so that the sleeve 1 rotates with the draw tube but is capable of limited relative longitudinal movement.

One end of the sleeve may receive an end of a bushing 4 on which is mounted the inner race of a radial and thrust bearing 5. The outer race of the bearing 5 is received in an axially directed cylindrical portion 6 of a housing structure 7. The housing structure also includes a radially directed wall 8 to which the cylindrical portion is joined. The wall is provided with a central aperture to receive the draw tube.

An annular boss 9 extends from the margins of the central aperture to form a sleeve which clears the draw tube. The radially outer portion of the wall 8 is joined to a cylindrical wall 10. The confronting surfaces of the boss or sleeve 9 and the cylindrical wall 10 adjacent the radial wall 8 form the boundaries of an annular pressure cylinder 11 which receives an annular seal member 12 having radially inner and radially outer seal flanges. The seal member is backed by a piston 13 which includes an axially directed cylindrical portion 14 in which fits the outer race of a second combination thrust and radial bearing 15.

The inner race of the bearing 15 is mounted on a bushing 16 which fits on the draw tube D. The bushing may be anchored thereto by a collar 17 and set screws 18. The axial extremity of the cylindrical wall 10 overlies the cylindrical portion 14 of the piston and receives an annular ring plate 19 secured thereto by screws. The cylindrical portion 14 and the cylindrical wall 10 define an annular chamber, the end walls of which are defined by the ring plate 19 and the outer margin of the piston 13. A plurality of coil springs 20 are interposed between the piston 13 and the ring plate. These springs may be maintained in place by stop pins 21.

The pressure chamber 11 is provided with a port which may be formed in the radial wall 8 so that air may be supplied to and discharged from the pressure cylinder.

Figure 2:
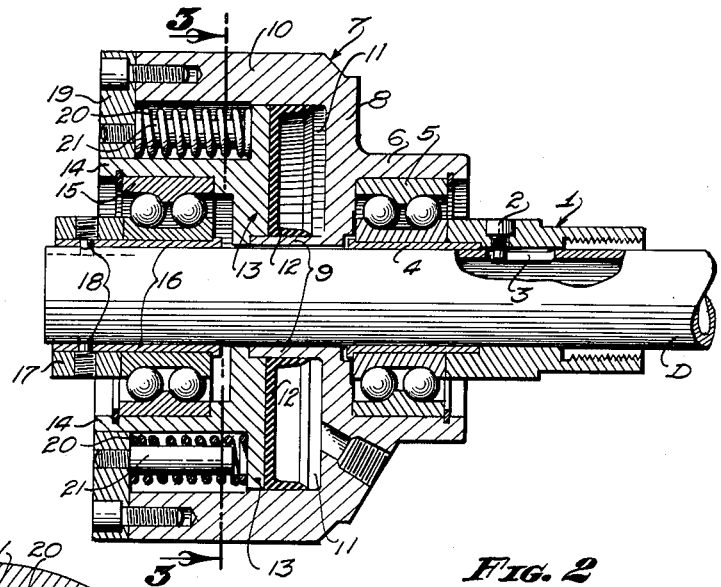
Figure 2 is an enlarged longitudinal sectional view of my collet chuck operating mechanism with the collet draw tube shown fragmentarily.
Figure 3:
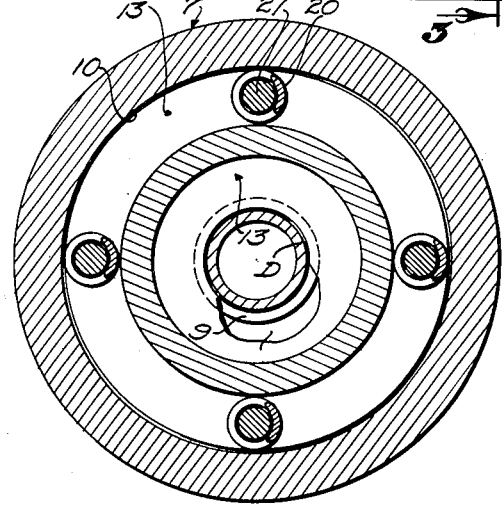
Figure 3 is a transverse sectional view through 3—3 of Figure 2.

Operation of my collet chuck operating mechanism is as follows:

Normally the parts of the operating mechanism are in the positions shown in Figure 2, that is, the springs 20 urge the piston 13 toward the radial wall 8 until limited by engagement of the inner margin of the piston 13 with the axial extremity of the boss or sleeve 9. Upon application of air pressure to the pressure cylinder 11 the piston 13 moves outwardly from the radial wall 8 against the action of the springs 20. This movement causes the draw tube D to shift axially and close the collet contained in the collet chuck C. In order to prevent excessive movement of the draw tube, the pins 21 limit outward movement of the piston 13. The housing structure 7 is anchored against rotation as well as axial travel by the air supply line L, or any other suitable means.

It will be observed that the draw tube and inner races of the bearings rotate with the head stock spindle and that the collet chuck operating mechanism may cause the collet to grip or release work pieces without stopping rotation of the collet chuck. It also will be observed that the collet chuck operating mechanism does not interfere with insertion of work pieces through the hollow draw tube.

The bushings 4 and 16 may be adapter bushings and be interchangeable with bushings of different diameter for mounting the operating mechanism on draw bars of different sizes. Similarly, the sleeve 1 may be interchangeable to accommodate different sizes and types of lathe spindles.

Having fully described my invention, it is to be understood that I do not wish to be limited to the details herein set forth, but my invention is of the full scope of the appended claims.

I claim:

1. An operating mechanism for a lathe collet chuck having a draw bar extending through the spindle of the lathe headstock, comprising: an adapter sleeve slidably mounted on said draw bar and engageable with the lathe spindle; a thrust bearing carried by said adapter sleeve; an annular housing carried by said bearing and adapted to be fixed against rotational and axial movement, said housing defining a radial wall and radially outer and radially inner cylindrical walls directed axially away from said radial wall; a second adapter sleeve secured to the extended end of said draw bar in spaced relation to said first sleeve, said radially inner cylindrical wall being disposed between said sleeves; a second thrust bearing carried by said second adapter sleeve; and an annular piston including a seal means carried by said second bearing and slidable between said radially inner and radially outer cylindrical walls to form with the radial wall of said housing an annular axially expandible piston and cylinder means; yieldable means for contracting said piston and cylinder means; means for ingress and egress of fluid to expand and permit contraction of said piston and cylinder means; and guide and stop means carried by said housing for limiting movement of said piston and for supporting said yieldable means.

2. An operating mechanism for a lathe collet chuck having a draw bar extending through the spindle of the lathe headstock, comprising: an adapter sleeve slidably mounted on said draw bar and engageable with the lathe spindle; a thrust bearing carried by said adapter sleeve; an annular housing carried by said bearing and adapted to be fixed against rotational and axial movement, said housing defining a radial wall and radially outer and radially inner cylindrical walls directed axially away from said radial wall; a second adapter sleeve secured to the extended end of said draw bar in spaced relation to said first sleeve, said radially inner cylindrical wall being disposed between said sleeves; a second thrust bearing carried by said second adapter sleeve; an annular piston including a seal means carried by said second bearing and slidable between said radially inner and radially outer cylindrical walls to form with the radial wall of said housing an annular axially expandible piston and cylinder means; means for ingress and egress of fluid to expand and permit contraction of said piston and cylinder means; a retainer ring plate secured to the radially outer cylindrical wall of said housing; axially directed springs between said plate and said piston adapted to urge said piston toward said radial wall; and stop means to limit axial travel of said piston.

3. An operating mechanism for a lathe collet chuck having a draw bar extending through the spindle of the lathe headstock, comprising: an annular housing surrounding said draw bar and adapted to be anchored against rotational and axial movement, said housing defining a radial wall, and radially inner and radially outer cylindrical walls directed axially from said radial wall; a first bearing means connecting said housing to said draw bar to permit rotation and axial movement of said draw bar relative to said housing; an annular piston and seal means slidable between said radially inner and radially outer cylindrical walls to form with the radial wall of said housing an annular, axially directed piston and cylinder means; means permitting ingress and egress of fluid to and from said piston and cylinder to expand and permit contraction thereof; a second bearing means connecting said piston and draw bar to permit rotation of said draw bar, but arranged to prevent axial movement thereof relative to said piston whereby said draw bar is movable axially on movement of said piston; a retainer ring plate secured to the radially outer cylindrical wall of said housing; axially directed springs between said plate and said piston adapted to urge said piston toward said radial wall; and stop means to limit axial travel of said piston.

4. An operating mechanism for a lathe collet chuck having a draw bar extending through the spindle of the lathe headstock, comprising: a sleeve surrounding said draw bar and adapted for attachment to said spindle, said draw bar protruding through said sleeve; a second sleeve secured to the protruding end of said draw bar and spaced from said first sleeve; a bearing carried by said first sleeve; a housing carried by said first bearing and including a radially inner cylinder wall surrounding said draw bar between said sleeves, and a radially outer cylinder wall; an annular piston having a seal means and axially movable in the space between said walls and forming therewith an expansible chamber; means for ingress and egress of fluid to expand and permit contraction of said chamber; a second bearing supporting said piston on said second sleeve; and means for contracting said chamber.

5. An operating mechanism for a lathe collet chuck having a draw bar extending through the spindle of the lathe headstock, comprising: a sleeve surrounding said draw bar and adapted for attachment to said spindle, said draw bar protruding through said sleeve; a second sleeve secured to the protruding end of said draw bar and spaced from said first sleeve; a bearing carried by said first sleeve; a housing carried by said first bearing and including a radially inner cylinder wall surrounding said draw bar between said sleeves, a radially outer cylinder wall extending axially over said second sleeve, and an internal flange at the extremity of said radially outer cylinder wall; an annular piston having a seal means and axially movable in the space between said radially inner and outer cylinder walls; a second bearing supporting said piston on said second sleeve; a first means for applying a force between one side of said piston and housing to draw said draw bar, and a second means for applying a force between said housing and the other side of said piston to push said draw bar.

6. An operating mechanism for lathe collet chucks as set forth in claim 5, wherein: said first means includes a pressure fluid supply communicating through said housing, and said second means includes springs disposed between said piston and said internal flange.

References Cited in the file of this patent
UNITED STATES PATENTS

| | | |
|---|---|---|
| 1,406,006 | Hanson | Feb. 7, 1922 |
| 2,393,458 | Cook | Jan. 22, 1946 |
| 2,455,586 | Kooima | Dec. 7, 1948 |
| 2,462,155 | Benjamin et al. | Feb. 22, 1949 |